United States Patent [19]
Simon et al.

[11] Patent Number: 5,965,029
[45] Date of Patent: Oct. 12, 1999

[54] SYSTEM AND METHOD FOR TREATING AN OIL GAS WELL STREAM

[76] Inventors: Jules A. Simon, 3339 Tezcucco Ave., Baton Rouge, La. 70820; Mark G. Arceneaux, 224 Hesper Dr., Carencro, La. 70520

[21] Appl. No.: 09/094,795

[22] Filed: Jun. 15, 1998

[51] Int. Cl.[6] .............................. B01D 15/00; C02F 9/00
[52] U.S. Cl. ........................ 210/663; 210/664; 210/694; 210/806; 210/104; 210/257.1
[58] Field of Search ..................... 210/664, 694, 210/266, 806, 257.1, 104, 663

[56] References Cited

U.S. PATENT DOCUMENTS

| | | | |
|---|---|---|---|
| 3,664,951 | 5/1972 | Armstrong | 210/44 |
| 3,738,490 | 6/1973 | Tigerman | 210/145 |
| 3,876,135 | 4/1975 | Harvey et al. | 494/37 |
| 4,243,528 | 1/1981 | Hubbard et al. | 210/104 |
| 4,517,094 | 5/1985 | Beall | 210/664 |
| 4,592,849 | 6/1986 | McMillen | 210/799 |
| 4,826,609 | 5/1989 | Hensley | 210/792 |
| 4,839,054 | 6/1989 | Ruebush et al. | 210/639 |
| 4,874,528 | 10/1989 | Foreman et al. | 210/705 |
| 5,227,071 | 7/1993 | Torline et al. | 210/694 |
| 5,310,486 | 5/1994 | Green et al. | 210/638 |
| 5,364,532 | 11/1994 | Bellos et al. | 210/639 |
| 5,637,223 | 6/1997 | Bellos et al. | 210/639 |
| 5,833,867 | 11/1998 | Hensley | 210/792 |

Primary Examiner—Jay H. Woo
Assistant Examiner—Frank M. Lawrence
Attorney, Agent, or Firm—Domingue & Waddell, PLC

[57] ABSTRACT

The invention pertains to a system and process for removing contaminants from an oil and gas well bore stream. The system comprises a vessel adapted to receive the stream from the well bore. The system also contains a centrifuge separator for breaking the emulsion of the stream, the centrifuge separator having an input for receiving the output stream from the vessel. A media filter member, which is adapted to receive the stream from the output of the centrifuge separator is also included with the system. The system further contains a carbon adsorption means, adapted to receive the output stream from the media filter, for adsorption of contaminants contained within the output stream. Also included is a level controller switch for measuring the level within the various tanks and generating a signal once a predetermined height is reached. Controller valves may also be provided, with the controller valves being operatively associated with the level controller switch for receiving the signal and opening a valve in order to release the stream to the centrifuge means. Also, the media filter further comprises a closed loop back wash line adapted to the media filter for back washing the media filter, along with a back wash tank and back wash line fluidly connecting the back wash tank to the vessel for recycling.

16 Claims, 1 Drawing Sheet

SYSTEM AND METHOD FOR TREATING AN OIL GAS WELL STREAM

BACKGROUND OF THE INVENTION

This invention relates to a system and process for separating contaminants from an effluent. More particularly, but not by way of limitation, this invention relates to a system and process for separating contaminants from a stream that is being produced from an oil and gas reservoir that has a pH of 7 or less.

In the oil and gas industry, operators will complete a well to a hydrocarbon bearing zone. An effluent will be produced from the well, with the effluent containing a mixture of hydrocarbons and water. At the surface, the effluent is separated into a hydrocarbon liquid phase, a hydrocarbon gas phase and a water phase as is well understood by those of ordinary skill in the art. The hydrocarbons are generally directed to processing facilities for sale and refinement. The produced water will be disposed by conventional methods. In offshore areas, this may entail releasing the water over board into the ocean. In other areas, the operator may choose to inject the produced water to a subterranean reservoir.

Many operators will attempt to increase the production of the well by performing acid stimulation to the reservoir. The acid stimulations require pumping large amounts of acid into the permeable formation, and thereafter, flowing the well in order to retrieve the spent acid as well as returning the well to normal production. The effluent being produced from the well will contain a mixture of at least the following components: a hydrocarbon liquid phase, a hydrocarbon gas phase, a spent acid compound, solids and water.

Due to the toxic nature of this type of effluent, the handling of the effluent is of concern to operators. Also, governmental regulations throughout the world have been promulgated that regulate the handling and disposal of these types of effluents. Also, if the effluent is recycled back into the production facilities, the effluent will cause equipment problems which can lead to equipment failures. The failure of equipment in these remote and offshore areas can cause significant problems to the safety and health of personnel and the environment as is well understood by those of ordinary skill in the art.

Prior art systems have been developed in order to segregate the various components constituting the effluent, and therefore, separate out the toxic, hazardous or otherwise unwanted components. These systems include, but not limited to: chemical treatments; separation in a gravity-type vessel; separation via a centrifuge separator; separation with filters. Each of these systems have some merit. However, the prior art systems fail for many reasons including limited success with proper separation, expense, amount of manpower required, further problems with contaminated treating fluids, disposal of treating media, lack of available injection wells, etc. This list is meant to be illustrative.

Therefore, there is a need for a system and process for treating oil and gas well fluids. There is also a need for a process whereby acid treatment flow back fluids can be handled. There is a need for an automated system of treating low pH effluents produced from oil and gas well bores whereby waste is minimized. There is a further need for a system that will treat production well fluids having a pH of 7 or less that will comply with government statutes and regulations. These and many other needs will be met by a reading of the following description.

SUMMARY OF THE INVENTION

A system for removing contaminants from an oil and gas well bore stream, with the stream having a pH of less than 7 is disclosed. The system comprises a vessel having an inlet and an outlet, with the inlet being adapted to receive the stream from the well bore. The system also contains a centrifuge means for breaking the emulsion of the stream, the centrifuge means having an input for receiving the output stream from the vessel. A media filter member, which is adapted to receive the stream from the output of the centrifuge means is also included with the system, with the media filter member also generating an output stream.

In the preferred embodiment, the system further contains a carbon adsorption means, adapted to receive the output stream from the media filter, for adsorption of contaminants contained within the output stream. A discharge line, operatively associated with the carbon adsorption means, is provided for discharging the output stream from the carbon adsorption means.

The system may further consist of a second outlet formed on the vessel and adapted to collect oil, and wherein, the vessel is sized so as to allow a 25 minute retention time of the stream at a flow rate of 17 gallons per minute so that the oil collects at the top of the vessel and the heavier components settle to the bottom. In this embodiment, the second outlet directs the oil for transferral to an oil storage tank.

The novel system may further comprise a level controller means for measuring the level of the stream within the vessel and generating a signal once a predetermined height is reached. A control valve means may also be provided, with the control valve means being operatively associated with the level controller means for receiving the signal and opening a valve in order to release the stream to the centrifuge means.

In one embodiment, the centrifuge means contains a second output line for delivering the lighter oil phase to the oil storage tank. The system may further comprise a feed tank, adapted to receive the heavier water phase output from the centrifuge means, and a pump means for pumping this phase from the feed tank to the media filter. Also, the media filter further comprises a closed loop back wash line adapted to the media filter for back washing the media filter, along with a back wash tank. Also, the output from the back wash tank may be connected to the inlet of the vessel so that the contents of the back wash tank may be delivered to the vessel for recycling the contents of the back wash tank through the system.

Further, there is disclosed herein a process for treating a stream from an oil and gas well bore. The stream has a pH of less than 7 and contains contaminants. In one embodiment, the stream contains contaminants from a previously performed acidizing treatment to a subterranean reservoir. The process comprises collecting the stream in a vessel and separating the stream into a first phase and a second phase. The process includes directing the second phase to a centrifuge means and demulsifying the second phase in the centrifuge. The centrifuge means will break the emulsion so that the stream is separated into a phase containing primarily oil and a phase containing primarily water. Nevertheless, the water phase will still contain some contaminants such as insoluble organics, oil and solids.

The water output phase (also referred to as the third phase) from the centrifuge means is then directed to a media filter wherein the media filter will further separate the contaminants (including hydrocarbons and solids) and water. The contaminants contained within the stream will attach to the media included therein, and therefore, the stream is further separated. Next, the output stream from the media filter may be discharged overboard, to the production system, or to the carbon adsorption unit depending on the adequacy of the clean-up.

In the preferred embodiment, the step of collecting the stream in the vessel further comprises measuring the level of the stream and controlling the rate of flow of the stream through the vessel. The step of separating the stream into a first phase and a second phase includes separating the contaminants into particles of greater than 150 microns such that the output directed to the centrifuge means contains contaminants of particle size of 150 microns and less. The process further includes directing the first phase into a tank, and directing the contents of the tank into the production system.

In the step of directing the contents of the tank into the production system, the process further includes measuring the level of the contents within the tank, and discharging the contents of the tank into the production system once a predetermined level has been reached within the tank. In the step wherein the third phase is directed to the media filter, the process includes collecting the third phase in a feed tank, and measuring the level of the contents within the feed tank. The contents of the feed tank are pumped to the media filter. In the event that the contents of the feed tank reach a predetermined level, the system provides for recycling of the contents.

In one embodiment of the present invention, the media filter may be back washed via a back wash tank. A centrifugal pump is included in order to fluidize the media filter. The stream within the media filter unit is then directed to the back wash tank which in turn is directed back to the surge vessel. Thus, any oil from the media filter is placed back in the system for treatment and ultimately back into the production system. This step also minimizes waste.

In the normal sequence of operations, the operator will continue to treat the output effluent. Thus, the process includes directing the media filter output effluent into a carbon adsorption chamber and contacting the contaminants with a carbon located within the carbon adsorption chamber. The process then entails producing an output from the carbon adsorption chamber and channeling the output to a disposal line for disposal of the output. In this embodiment, the output contains a 2 micron level or less of contaminant particle size, and wherein the step of channeling the output to the disposal line includes disposing of the output overboard from an offshore platform.

An advantage of the present system includes allowing for the processing of oil and gas well bore fluids. Another advantage includes the processing of well bore fluids that contain spent acids. Another advantage is that the spent acid solutions do not disturb the production facilities associated with oil and gas wells. Another advantage includes the ability to treat low pH streams, emulsions and dissolved contaminates associated with oil and gas production. An advantage includes use of level controller means and control valves to automatically regulate flow rate and discharge throughout the process.

Still yet another advantage includes an automated process containing multiple phases that are integrated with one another. Yet another advantage is that the system is economical to set-up and treat in remote locations due to the automated nature of the system. Still yet another advantage is that the system does not require a large number of personnel to maintain the system. Another advantage is that the system will allow compliance with strict government regulations.

Another advantage includes the operator may dispose produced water over board and/or in remote locations. Yet another advantage is that the amount of waste generated via the novel process is minimized. In the prior art, the removal of contaminants poses a significant problem. Further, the prior art methods used to clean-up effluents generate further waste that also require proper disposal. In other words, by cleaning up the original waste, a new and different type of waste is created. In accordance with the teachings of the present invention, the novel process cleans the effluent without generating additional waste. Still yet another advantage is that the time for treating the effluent is minimized which in turn allows for quicker return to production which allows for faster revenue recovery.

A feature includes use of a back wash system for cleaning the media filter, with the back wash fluid then being recycled through the system for treatment. Another feature of the present invention allows for use of a flash/surge vessel to separate the effluent into three phases, namely oil, water and gas. Another feature includes employment of a liquid/liquid centrifuge that is used to deemulsify the effluent. Yet another feature is utilization of a media filter for further separation of contaminants.

Still yet another feature includes the media filter may be back washed for regeneration of the media bed for continued use. Yet another feature is that the carbon adsorption treatment is placed downstream of the media filter to remove soluble hydrocarbons and priority pollutants. Another feature is that the various components may be automated so that the levels within the various vessels and tanks may be regulated for continuous processing.

DETAILED DESCRIPTION OF THE PREFERRED EMBODIMENTS

Figure 1:
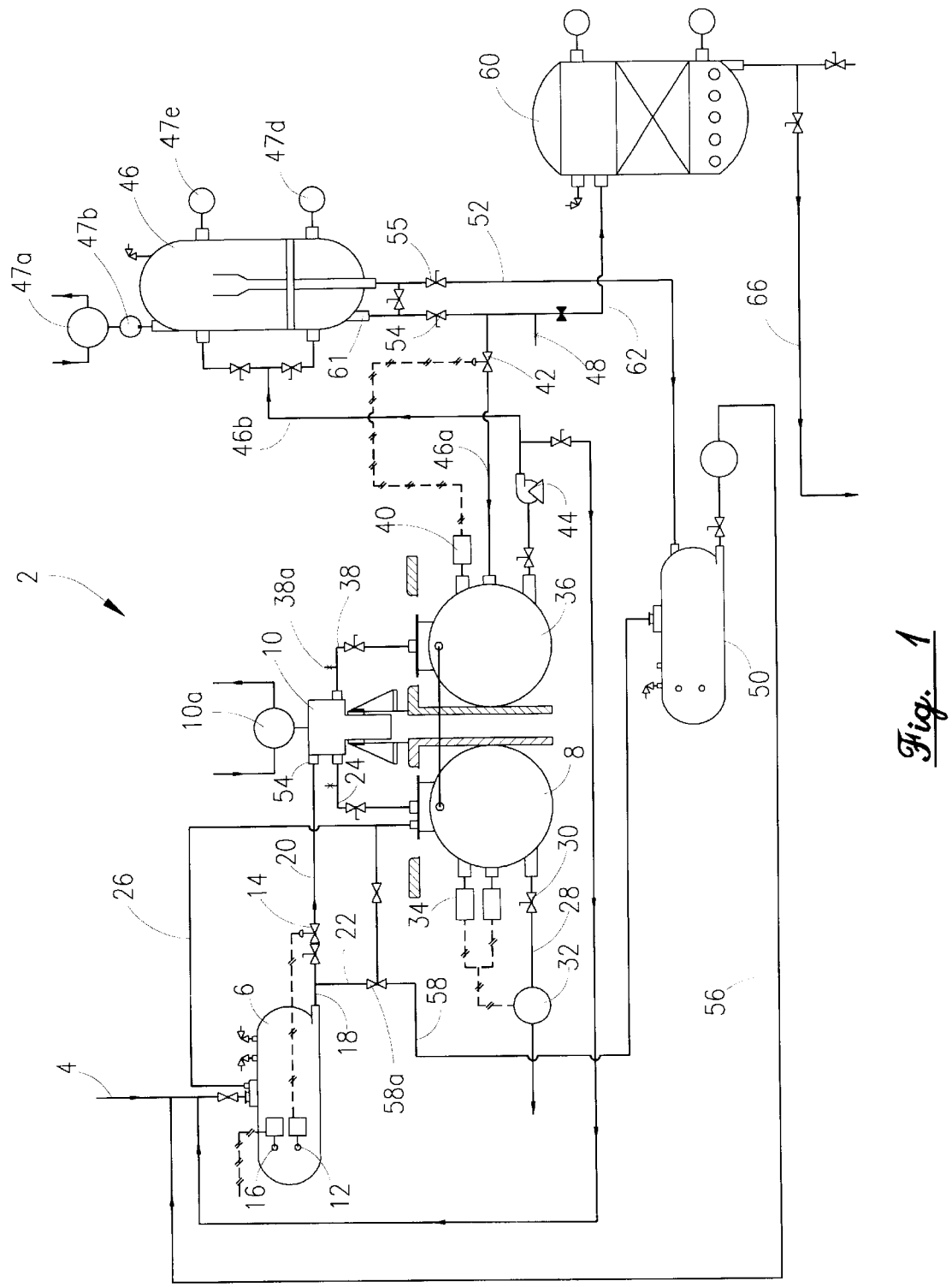
FIG. 1 is a process schematic of the preferred embodiment of the present invention.

In FIG. 1, a process schematic depicting the novel system 2 will now be described. The system 2 will include an inlet 4 that serves as directing an incoming effluent stream from a subterranean reservoir. Generally, the inlet 4 is associated with a well that is completed to a hydrocarbon reservoir and wherein the reservoir will produce a mixture of oil, gas and water. In one embodiment, the well is located in a remote region such as in water and wherein the well is positioned on an offshore platform.

As per the teachings of the present invention, the system may be used after the reservoir has been treated with an acid stimulation treatment. As is well understood by those of ordinary skill in the art, an acid stimulation treatment is performed in order to clean the well bore of damage and increase production, as well as other advantages well known to those involved in this industry. After the acid is injected down hole, the acid will be flowed back to the surface.

The inlet 4 will be directed to a surge vessel 6 that will collect the effluent stream, with the effluent stream containing the spent acid, oil, gas, solids and water. The pH of the effluent may be less than 7. The effluent that is placed within the vessel 6 will have a retention time in which to separate into its various factions. Thus, the gas may be allowed to flash out of solution. The vessel 6 will provide a residence time of 10 minutes at 50 gallons per minute (GPM) and 25 minutes retention at a minimum flow of 17 GPM. This will allow entrained gases to flash out of solution and be sent to the platform flare system. Primary separation of any free oil, generally oil droplets greater than 150 microns in size, will take place in vessel 6.

The free oil will then be sent to the oil tank 8 via line 26, with the oil tank 8 also collecting oil extracted in the second phase of the treatment via the centrifuge means 10 (via line 24). A pneumatic level controller means 12 and control valve 14 are provided and will control the liquid level within vessel 6. The level controller means 12 will maintain a selected level in the surge tank 6 by controlling the water flow rate leaving vessel 6. The level controller means 12 is well known in the art and is commercially available from Fisher Controls Inc. under the name 2500-249BP. The control valve 14 is well known in the art and is commercially available from Fisher Controls Inc. under the name 357. The ability of the level controller means 12 to seek and maintain a level will compensate for the fluctuations in inlet flow to the system 2.

The vessel 6 may also include a level safety high switch 16 providing a pneumatic output for an alarm or shutdown mechanism as is well understood by those of ordinary skill in the art. The level safety switch 16 is well known in the art and is commercially available from Fisher Controls Inc. under the name 2680A-268T. Provisions will be made in the vessel 6 for the addition of emulsion treating chemicals. The chemicals can be used when needed to assist in the separation of effluent with reverse emulsions, or other specialty problems.

As shown, the effluent will exit the vessel via output line 18, with the output line 18 leading to a line 20, with line 20 being fluidly connected to the centrifuge means 10. The output will be generally water with mixed contaminants such as spent acid, oil and solids. The line 20 will have disposed therein the control valve 14 as previously described. The line 18/20 will carry the effluent from the vessel 6 to the centrifuge means 10. The line 18 is fluidly connected to the line 22.

The line 20 will direct the effluent into the centrifuge means 10 for treating the emulsion phase of the effluent. In the preferred embodiment, the centrifuge means 10 will effect a primary separation of the emulsion into a heavier phase (generally water) and a lighter phase (generally oil) contained in the effluent. The centrifuge means 10, also referred to as a liquid/liquid centrifuge 10, is commercially available from Cinc under the mark V-16. The centrifuge means 10 will significantly reduce the time required to treat the emulsions present in the effluent, especially those containing acid flow back fluids. The centrifuge means 10 is powered via the hydraulic motor 10a.

After the emulsion is broken in the centrifuge means 10, the lighter oil phase will be gravity fed to the centrifuge oil tank 8 via the line 24. It should be noted that the oil tank 8 also contains the line 26 for directing oil from the vessel 6 to the tank 8. The oil collected in the centrifuge oil tank 8 will be returned to the production system via line 28. As depicted, the line 28 contains the valve 30 along with pneumatic pump 32 for automated delivery to the production processing system. This occurs via the level control means 34 that signal when a predetermined level (signifying that it is time to dump the oil contained within tank 8) is reached, with the level control means 34 being well known in the art as mentioned earlier.

The heavier water phase will be gravity fed to the water feed tank 36 via the line 38 that extends from the centrifuge means 10. It should be noted that while the output stream is referred to as the "heavier water phase", this phase still contains contaminants such as oil, solids and spent acid. Generally, the contaminants particle size is less than 50 microns. The monitoring may be accomplished through sampling from the sample point 38a.

The level control means 40 and level control valves 42, along with the pump 44 will automate the effluent feed rate to the third stage of the treatment process, namely to the media filter means 46. The level control means 40 and valve 42 seeks to maintain a set-point within tank 36 such that if there is too little flow, the system will recycle the effluent back into the tank 36 via recycle line 46a. In the preferred embodiment, the pump 44 is continually feeding from the effluent in tank 36 and pumping to the media filter 46 via line 46b.

In order to properly treat the effluent, it is necessary to remove a large percentage of finely dispersed oil droplets i.e. remove particles of 2 microns and greater. The removal of these micron sized oil droplets without generating additional volumes of solid waste is an integral part of this process. In the prior art, the extract of oil droplets of this size and quantity poses a significant problem. Further, the prior art methods used to alleviate this problem generate further waste that also require proper disposal. In other words, by cleaning up the original waste, a new and different type of waste is created. In accordance with the teachings of the present invention, the novel process cleans the effluent without generating additional waste.

As set out in FIG. 1, a media filter means 46 is used. In the preferred embodiment, a closed loop back-washable nutshell media filter 46 is employed, with the media filter 46 being commercially available from Baker Hughes Process Systems Inc. under the mark Silverband. The filter 46 may be a back flushable pecan and/or walnut media filter. The media filter 46 will remove entrained solids and dispersed hydrocarbon droplets down to 2 microns. The media filter 46 has operatively associated therewith the hydraulic motor 47a that powers the centrifugal pump 47b for fluidizing the nutshell media and back washing the nutshell media during the backwash cycle. Also, the media filter 46 also contains the pressure gauges 47c, 47d for determining the operating pressure and the pressure drop across the media so that excessive pressure drops during operation may be observed.

The process will be monitored downstream of the media filter for breakthrough to determine when a backwash cycle is required. The monitoring may be accomplished through sampling from the sample point 48 or the operator may observe the pressure drop within the media filter vessel 46. In accordance with the operation of a media filter 46, the fluid will be filtered for a 6 to 12 hour cycle then manually back flushed and regenerated. Thus, there is provided a back wash tank 50 that is fluidly connected to the media filter 46 via the back wash line 52.

The back wash tank 50 will be the repository of the back wash fluids. Thus, during the back wash cycle, the valve 54 is closed and valve 55 is opened so that the line 52 is fluidly connected to the back wash tank 50. The centrifugal pump 47b is energized which in turn fluidizes and back flushes the media filter and allows the fluid to drain to the back wash tank 50. This step of fluidizing and agitating the media filter cleans the nut shells of contaminants. The back wash fluid thus directed to the tank 50 may also be cleaned via the process previously described i.e. the fluid is directed to the vessel 6 via the line 56 thereby allowing the fluid to be recycled through the system for treatment purposes. Thus, if the back wash tank 50 contains a fluid with contaminants, the effluent may be separated via the four stage process herein disclosed. This back-washing step also minimizes the waste generated by the novel process. It should be noted that the operator may allow the fluid from the vessel 6 to be directed to the tank 50 via line 58 by opening the valve 58a if additional storage capacity is required.

In normal processing operation, the carbon adsorption means 60 is fluidly connected to the outlet 61 of filter 46. The fluid exiting the media filter 46 will exit via the line 62 to the carbon adsorption means 60 for adsorption of contaminants contained within the output stream from the media filter 46. The contaminants (oil, solids, spent acid, etc) have a particle size at this point of 2 microns and less. The carbon adsorption means 60 is commercially available from Coastal Chemical under the mark 8×30 Meshgac. This is the final polishing stage of the treatment that consist of allowing carbon adsorption of soluble hydrocarbons and priority pollutants.

The entire system 2 has been designed to reduce the amount of waste generated by the treatment process. The system 2 has also been designed so that the waste stream processing is automated for continuous flow. Pre-filtering the fluid to the 2 micron level will optimize the adsorption capacity of the activated carbon. Protecting the carbon from solid particulate will prevent premature failure of the carbon bed. It also exposes the carbon's tremendous amount of internal surface area to primarily hydrocarbon contaminates. The carbon can be regenerated and returned to service to maximize the useful life of each pound of carbon that is placed into service.

The process for treating a stream from an oil and gas well bore will now be described with reference to FIG. 1. Generally, the stream exiting the well bore will have a pH of less than 7 and contains contaminants. In one embodiment, the stream contains contaminants from a previously pre-formed acidizing treatment to a subterranean reservoir. The process comprises collecting the stream in the vessel 6 and separating the contaminants into a first phase and a second phase.

The step of collecting the stream in the vessel 6 further comprises measuring the level of the stream and controlling the rate of flow of the stream through the vessel 6 via the level controller means 12 and control valve 14. The step of separating the stream into a first phase and a second phase includes separating the contaminants into particles of greater than 150 microns. The process further includes directing the first phase into the tank 8 and directing the contents of the tank 8 into the production system.

The process includes directing the second phase to the centrifuge means 10 and demulsifying the second phase in the centrifuge 10. The centrifuge means 10 will break the emulsion such that the stream is separated into a phase containing primarily oil and a phase containing primarily water. The oil phase is directed via line 24 to the oil tank 8.

The primarily water output phase from the centrifuge means 10 is then directed to the feed tank 36 via line 38. The process includes collecting the third phase in a feed tank 36, and measuring the level of the contents within the feed tank 36. Thereafter, the contents of the feed tank 36 are discharged into the media filter 46 via the continuous pump 44. It is possible to recycle the effluent back into the tank 36 via the level controller 40 and valve 42 once a predetermined level has been reached within the feed tank 36 which signifies a slow rate of flow. Next, the stream is directed to the media filter 46 via pump 44 and line 46b. As noted earlier, the media filter 46 will further separate the stream. In one embodiment, the output stream may be disposed of by conventional means such as over board discharge or the output stream may be directed back into the production system. The production system may handle the stream in a normal mode. However, in the preferred embodiment, the output is then directed to the carbon adsorption chamber 60 as will be discussed below.

According to the teachings of the present invention, both the level of the oil tank 8 and the level of the feed tank 36 may be automatically monitored. With respect to the oil tank 8, this may be performed via the level control means 34 and pump 30. With respect to the feed tank 36, this may be accomplished via the level control means 40 and valve 42.

As noted earlier, in the preferred embodiment, the output exiting the media filter 46 is directed into the carbon adsorption chamber 60 and wherein the contaminants are contacted with the carbon located within the carbon adsorption chamber 60. The process then entails producing an output from the carbon adsorption chamber 60 and channeling the output to a disposal line for disposal of the output. In this embodiment, the output from chamber 60 contains a 2 micron level or less, and wherein the step of channeling the output to the disposal line 66 includes disposing of the output overboard from an offshore platform.

A back wash cycle is included. With this step, the valve 54 is closed and valve 55 is opened so that the line 52 is fluidly connected to the back wash tank 50. The centrifugal pump 47b is energized which in turn fluidizes and back flushes the media filter and allows the fluid to drain to the back wash tank 50. This step of fluidizing and agitating the media filter cleans the nut shells of contaminants. The back wash fluid thus directed to the tank 50 may also be recycled via the novel process previously described i.e. the fluid is directed to the vessel 6 via the line 56 thereby allowing the fluid to be recycled through the system for treatment purposes.

Changes and modifications in the specifically described embodiments can be carried out without departing from the scope of the invention which is intended to be limited only by the scope of the appended claims.

We claim:

1. A process for treating a stream from a subterranean oil and gas well, the process comprising:

performing an acidizing stimulation treatment to the subterranean oil and gas well;

producing the stream from the subterranean oil and gas well, with the stream having a pH of less than 7;

collecting the stream in a vessel;

separating the stream into a first phase and a second phase;

directing the second phase to a centrifuge member;

demulsifying the second phase in the centrifuge member so that a third phase and a fourth phase is produced;

directing the third phase to a closed-loop back washable nutshell media filter;

separating the third phase within said closed-loop back washable nutshell media filter into a fifth phase;

discharging the fifth phase from said closed-loop back washable nutshell media filter.

2. The process of claim 1 wherein the step of collecting the stream in the vessel further comprises:

measuring the level of the stream within said vessel;

controlling the rate of flow of the stream through the vessel;

and wherein the step of separating the stream into a first phase and a second phase includes separating the contaminants into a first phase containing particles greater than 150 microns and a second phase containing particles less than 150 microns.

3. The process of claim 1 further including:

directing the first phase into a tank;

directing the fourth phase into the tank;

directing the contents of the tank to an output line.

4. The process of claim 2 further comprising:

measuring the level of the contents within the tank;

discharging the contents of the tank into a production system once a predetermined level has been reached within the tank.

5. The process of claim 4 wherein the step of directing the third phase to the closed-loop back washable nutshell media filter includes:

collecting the third phase in a feed tank;

measuring the level of the third phase within the feed tank;

pumping the third phase into the closed-loop back washable nutshell media filter;

recycling the third phase of the feed tank once a predetermined level has been reached within the feed tank.

6. The process of claim 5 further comprising:

directing the fifth phase into an carbon adsorption chamber;

contacting the contaminants with a carbon located within the carbon adsorption chamber;

producing an output from the carbon adsorption chamber;

channeling the output to a disposal line for disposal of the output.

7. The process of claim 6 wherein the output from said carbon adsorption contains a 2 micron particle level or less, and wherein the step of channeling the output to the disposal line includes disposing of the output overboard from an offshore platform.

8. The process of claim 5 further including the step of:

shutting off the valve so that the fifth phase is no longer directed to the carbon adsorption chamber;

fluidizing the closed-loop back washable nutshell media filter;

back washing the closed-loop back washable nutshell media filter;

directing the stream to the back wash tank;

directing the stream within the back wash tank to the vessel for recycling.

9. A system for removing contaminants, the system comprising:

a vessel having an inlet, said inlet being adapted to receive a stream produced from an oil and gas subterranean reservoir, the stream containing a spent acid from an acid stimulation treatment and having a pH less than 7;

a centrifuge means for breaking the emulsion of the stream into a first phase and a second phase, the centrifuge means receiving the stream from said vessel;

a closed loop back washable nut shell media filter member adapted to receive the first phase from said centrifuge means and generate a third phase and wherein said media filter member further comprises; a closed loop back wash line adapted to said media filter member for back washing said media filter member with the stream, a back wash tank operatively attached to said closed loop back wash line for receiving the stream from said media filter member, and a back wash line fluidly connecting said back wash tank with said vessel;

carbon adsorption means, adapted to receive third phase from said media filter member, for adsorption of contaminants contained within the third phase and produce a fourth phase;

a discharge line, operatively associated with the carbon adsorption means, for discharging the fourth phase.

10. The system of claim 9 further comprising:

an oil storage tank adapted to fluidly receive the first phase from said centrifuge means;

and wherein said vessel is sized so as to allow a 25 minute retention time of the stream at a flow rate of 17 gallons per minute so that the oil collects at the top of said vessel; and wherein said vessel is adapted to direct the oil to said oil storage tank.

11. The system of claim 10 further comprising:

a pneumatic level controller means for measuring the level of the stream within the vessel and generating a signal once a predetermined height is reached;

a control valve means, operatively associated with said pneumatic level controller means, for receiving said signal and opening a valve in order to release the stream to said centrifuge means.

12. The system of claim 11 wherein said centrifuge means is powered by a hydraulic motor that is operatively attached to said centrifuge means.

13. The system of claim 12 further comprising:

a feed tank adapted to receive the first phase form said centrifuge means;

a second level controller means for measuring the level of the stream within said feed tank and generating a signal once a predetermined height is reached;

a second control valve means, operatively associated with said second level controller means, for receiving said signal and opening a valve in order to release the stream to said centrifuge means;

a pump means for pumping the stream from said feed tank to said media filter.

14. A system for removing contaminants, the system comprising:

a vessel adapted to receive a stream produced from an oil and gas subterranean reservoir, the stream having a spent acid from an acid stimulation treatment and having a pH of less than 7 and said vessel being sized to allow a retention time of the stream within said vessel, said vessel having a first output;

a centrifuge separator, fluidly connected to said first output, for breaking the emulsion of the stream, the centrifuge separator having an input for receiving the first output from said vessel and producing a first phase and a second phase;

an oil tank member for receiving said first phase from said centrifuge separator, a feed tank adapted to receive said second phase from said centrifuge separator;

a back flushable media filter member adapted to receive the second phase from said feed tank, and wherein said media filter member produces a third phase, said back flushable media filter member containing a media filter selected for the group comprising of a pecan nutshell or walnut nutshell;

carbon adsorption means, adapted to receive said third phase from said medial filter, for adsorption of a contaminant contained within said third phase and producing a fourth phase;

a discharge line, operatively associated with the carbon absorption means, for discharging said fourth phase.

15. The system of claim 14 further comprising:

a pneumatic level controller means for measuring the level of the stream within said vessel and generating a signal once a predetermined height is reached;

a control valve means, operatively associated with said pneumatic level controller means, for receiving said signal and opening a valve in order to release the stream to said centrifuge means.

16. The system of claim 15 wherein said back washable nutshell media filter member further comprises:

a closed loop back wash line adapted to said back washable nutshell media filter member for back washing the media filter;

a back wash tank operatively attached to said closed loop back wash line; said back wash tank configured for receiving the stream from said back washable nutshell media filter member;

a back wash line fluidly connecting said back wash tank with said vessel.

* * * * *